United States Patent [19]

Inoue

[11] Patent Number: 4,967,714
[45] Date of Patent: Nov. 6, 1990

[54] APPARATUS FOR CONTROLLING ENGINE OPERABLE ON GASOLINE/ALCOHOL FUEL BLEND

[75] Inventor: Ryuzaburo Inoue, Yamato, Japan

[73] Assignee: Nissan Motor Company, Limited, Japan

[21] Appl. No.: 453,897

[22] Filed: Dec. 20, 1989

[30] Foreign Application Priority Data

Jan. 9, 1989 [JP] Japan .................................. 1-1282

[51] Int. Cl.$^5$ ........................ F02D 41/14; F02D 19/08
[52] U.S. Cl. .................................. 123/489; 123/1 A
[58] Field of Search ................ 123/1 A, 440, 489, 575

[56] References Cited

U.S. PATENT DOCUMENTS 4,391,253 7/1983 Ito ..................................... 123/489 X
4,481,908 11/1984 Iida .................................. 123/489 X
4,706,629 11/1987 Wineland et al. .............. 123/1 A X

FOREIGN PATENT DOCUMENTS 56-98540 8/1981 Japan .

Primary Examiner—Tony M. Argenbright
Attorney, Agent, or Firm—Lowe, Price, LeBlanc, Becker & Shur

[57] ABSTRACT

An apparatus for use with an internal combustion engine operable on either of gasoline fuel and gasoline/alcohol fuel blend. The apparatus comprises an alcohol concentration sensor for sensing the alcohol concentration of the fuel to be delivered to the engine, an oxygen sensor sensitive to the oxygen content of exhaust gases discharged from the engine for producing an air/fuel ratio feedback signal, and a control unit coupled to the alcohol concentration sensor and the oxygen sensor for controlling the amount of fuel metered to the engine. The control unit calculates a basic value for the amount of fuel metered to the engine based on engine operating conditions and corrects the calculated basic value for the sensed alcohol concentration. A correction factor, which is set within a control range defined by predetermined upper and lower limits, is calculated based on a deviation of the air/fuel ratio from a stoichiometric value. The calculated basic value is corrected based on the calculated correction factor to provide a closed loop air/fuel ratio control. The upper and lower limits are changed to expand the control range in the presence of an alcohol concentration signal change exceeding a predetermined degree.

10 Claims, 4 Drawing Sheets

APPARATUS FOR CONTROLLING ENGINE OPERABLE ON GASOLINE/ALCOHOL FUEL BLEND

BACKGROUND OF THE INVENTION

This invention relates to an apparatus for controlling an internal combustion engine operable on gasoline fuel or gasoline/alcohol fuel blend.

For example, Japanese Patent Kokai No. 56-98540 discloses an apparatus for controlling an internal combustion engine operable on gasoline fuel or gasoline/alcohol fuel blend. The engine control apparatus employs an alcohol concentration sensor sensitive to the alcohol concentration of the fuel delivered through a fuel injector to the engine. The sensed alcohol concentration is used in calculating an appropriate value for fuel delivery requirement in the form of fuel-injection pulsewidth. The engine control apparatus also employs an oxygen sensor sensitive to a deviation of the air/fuel ratio from a stoichiometric value. The sensed deviation is used in calculating a correction factor for correcting the fuel delivery requirement value to provide a closed loop air/fuel ratio control. The correction factor is set within a control range defined by predetermined upper and lower limits, for example +25% with respect to a value obtained at a stoichiometric air/fuel ratio. If a great difference exists between the alcohol concentration of the fuel sensed by the alcohol concentration sensor and the alcohol concentration of the fuel residual in the fuel injector just after the engine is refueled, the air/fuel ratio will deviate greatly from stoichiometry, causing the correction factor to be clamped to the upper or lower limit. With such a conventional apparatus, however, this clamped state cannot be released in a short time sufficient to avoid an unstable engine operation which would eventually caused the engine to stall.

In addition, the conventional apparatus is arranged to maintain the correction factor at a fixed value so as to suspend the closed loop air/fuel ratio control when the engine is idling. Although this arrangement is effective to avoid an unstable engine operation at idle conditions, its effectiveness is limited or invalidated when the sensed alcohol concentration changes to a great extent.

SUMMARY OF THE INVENTION

Therefore, it is a main object of the invention to provide an engine control apparatus which can continue smooth and stable engine operation regardless of a great change in the alcohol concentration of the fuel delivered to the engine.

There is provided, in accordance with the invention, an apparatus for use with an internal combustion engine operable on either of gasoline fuel and gasoline/alcohol fuel blend. The apparatus comprises an alcohol concentration sensor sensitive to an alcohol concentration of the fuel to be delivered to the engine for producing an alcohol concentration signal indicative of a sensed alcohol concentration, and an oxygen sensor sensitive to an oxygen content of exhaust gases discharged from the engine for producing an air/fuel ratio feedback signal. The apparatus also comprises a control unit coupled to the alcohol concentration sensor and the oxygen sensor for controlling the amount of fuel metered to the engine. The control unit includes means for calculating a basic value for the amount of fuel metered to the engine based on engine operating conditions, means responsive to the air/fuel radio feedback signal for calculating a first correction factor based on a deviation of the air/fuel ratio from a stoichiometric value, the first correction factor being within a control range defined by predetermined upper and lower limits, means for correcting the calculated basic value for the sensed alcohol concentration, means for correcting the calculated basic value based on the calculated first correction factor to provide a closed loop air/fuel ratio control, and means sensitive to an alcohol concentration signal change exceeding a predetermined degree for changing the upper and lower limits to expand the control range.

In another aspect of the invention, there is provided an apparatus for use with an internal combustion engine operable on either of gasoline fuel and gasoline/alcohol fuel blend. The apparatus comprises an alcohol concentration sensor sensitive to an alcohol concentration of the fuel to be delivered to the engine for producing an alcohol concentration signal indicative of a sensed alcohol concentration, and an oxygen sensor sensitive to an oxygen content of exhaust gases discharged from the engine for producing an air/fuel ratio feedback signal. The apparatus also comprises a control unit coupled to the alcohol concentration sensor and the oxygen sensor for controlling the amount of fuel metered to the engine. The control unit includes means for calculating a basic value for the amount of fuel metered to the engine based on engine operating conditons, means responsive to the air/fuel ratio feedback signal for calculating a first correction factor based on a deviation of the air/fuel ratio from a stoichiometric value, the first correction factor being within a control range defined by predetermined upper and lower limits, means for correcting the calculated basic value for the sensed alcohol concentration, means for correcting the calculated basic value based on the calculated first correction factor to provide a closed loop air/fuel ratio control, means for clamping the first correction factor to one of the upper and lower limits to place the closed loop air/fuel ratio control into a clamped state when the engine is idling, and means sensitive to an alcohol concentration signal change exceeding a predetermined degree for releasing the closed loop air/fuel ratio control from the clamped state.

BRIEF DESCRIPTION OF THE DRAWINGS

The invention will be described in greater detail by reference to the following description taken in connection with the accompanying drawings, in which.

DETAILED DESCRIPTION OF THE INVENTION

Figure 1:
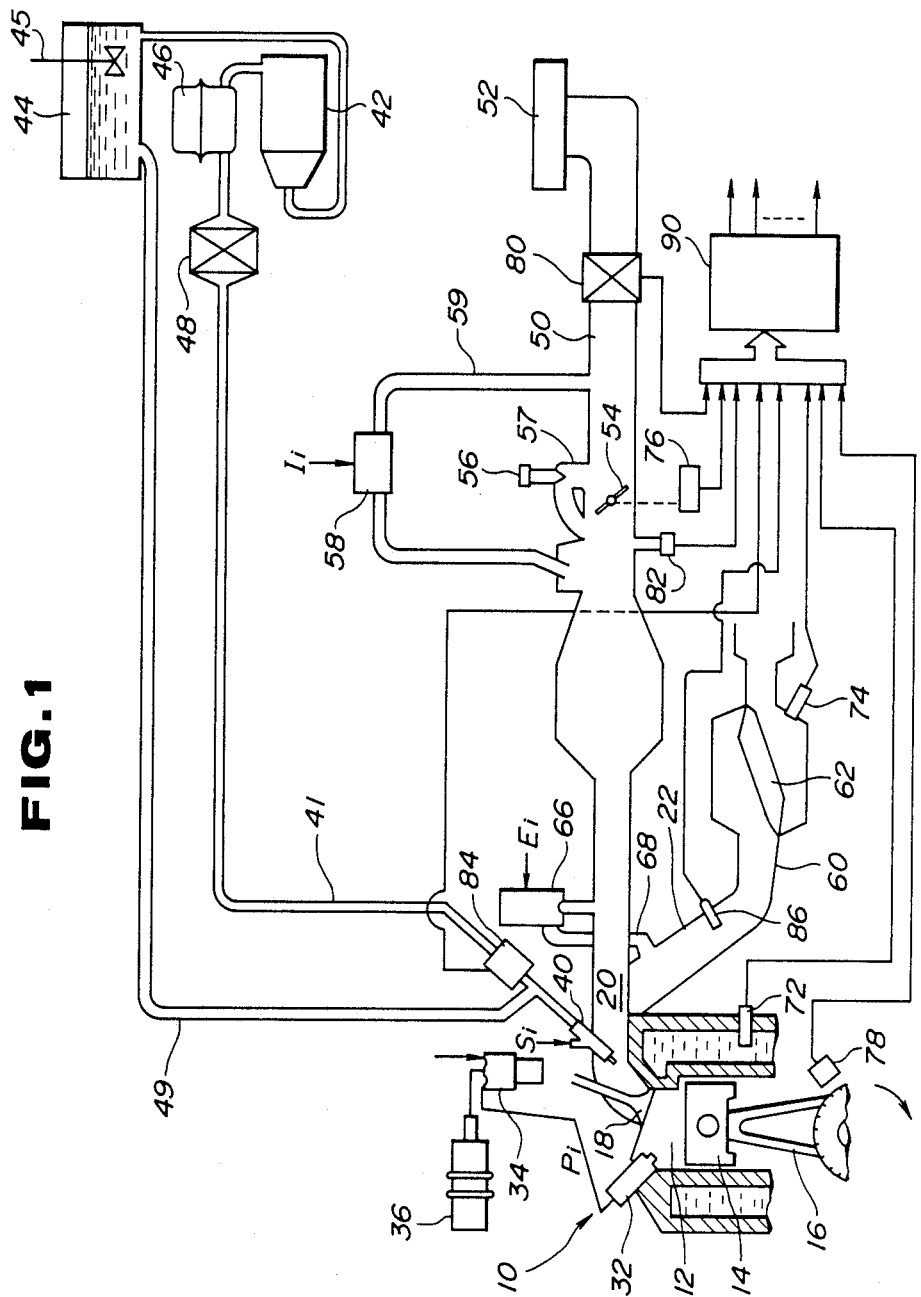
FIG. 1 is a schematic block diagram of an internal combustion engine to which the invention is applicable.

With reference to the drawings, and in particular to FIG. 1, there is shown a schematic diagram of an engine control apparatus embodying the invention. An internal combustion engine, generally designated by the numeral 10, for an automotive vehicle includes a combustion chamber or cylinder 12. A piston 14 is mounted for reciprocal motion within the cylinder 12. A crankshaft 16 is supported for rotation within the engine 10 in response to reciprocation of the piston 14 within the cylinder 12.

An intake manifold 20 is connected with the cylinder 12 through an intake port with which an intake valve 18 is in cooperation for regulating the entry of combustion ingredients into the cylinder 12 from the intake manifold 20. A spark plug 32 is mounted in the top of the cylinder 12 for igniting the combustion ingredients within the cylinder 12 when the spark plug 32 is energized by the presence of high voltage electrical energy Pi from a distributor 34 connected to an ignition coil 36. An exhaust manifold 22 is connected with the cylinder 12 through an exhaust port with which an exhaust valve (not shown) is in cooperation for regulating the exit of combustion products, exhaust gases, from the cylinder 12 into the exhaust manifold 22. The intake and exhaust valves are driven through a suitable linkage with the crankshaft.

A fuel injector 40 is connected by a conduit 41 to a fuel pump 42 which is also connected to a fuel tank 44. The fuel pump 42 is electrically operated to maintain sufficient pressure. The fuel tank 44 contains a gasoline fuel or gasoline-alcohol fuel blend. The alcohol fuel may include methanol, ethanol, or methanol/ethanol blend. A device 45 is provided for stirring the gasoline-alcohol fuel blend to achieve a constant alcohol concentration in the fuel tank 44. A fuel pressure regulator 46 is connected to the fuel pump 42 and through a fuel filter 48 to the fuel injector 40. The pressure regulator 46 maintains the pressure differential across the fuel injector 40 at a constant level. This regulation is accomplished by a variation in the amount of excess fuel returned through the return conduit 49 to the fuel tank 44. The fuel injector 40 opens to inject fuel into the intake manifold 12 when it is energized by the presence of electrical current Si. The length of the electrical pulse, that is, the pulse-width, applied to the fuel injector 40 determines the length of time the fuel injector opens and, thus, determines the amount of fuel injected into the intake manifold 20.

Air to the engine 10 is supplied through an air cleaner 52 into an induction passage 50. The amount of air permitted to enter the combustion chamber through the intake manifold 20 is controlled by a butterfly throttle valve 54 located within the induction passage 50. The throttle valve 54 is connected by a mechanical linkage to an accelerator pedal (not shown). The degree to which the accelerator pedal is depressed controls the degree of rotation of the throttle valve 54. The accelerator pedal is manually controlled by the operator of the engine control system. An idle adjustment screw 56 is provided to control the amount of air introduced into the induction passage 50 through a passage 57 bypassing the throttle valve 54 when the engine is idling. Similarly, a control valve 58 is provided to control the amount of air introduced into the induction passage 50 through a passage 59 bypassing the throttle valve 54. Preferably, the control valve 58 responds to a control pulse signal by opening the bypass passge 59 according to the duty ratio of the control pulse signal.

In the operation of the engine 10, fuel is injected through the fuel injector 40 into the intake manifold 20 and mixes with the air therein. The engine is of the conventional four-cycle type. When the intake valve opens, the air-fuel mixture enters the combustion chamber 12. An upward stroke of the piston 14 compresses the air-fuel mixture, which is then ignited by a spark produced by the spark plug 32 in the combustion chamber 12. Combustion of the air-fuel mixture in the combustion chamber 12 takes place, releasing heat energy, which is converted into mechanical energy upon the power stroke of the piston 14. At or near the end of the power stroke, the exhaust valve opens and the exhaust gases are discharged into the exhaust manifold 22. Most of the exhaust gases are discharged to the atmosphere through an exahust system which conventionally includes an exhaust passage 60, a catalytic converter 62, a muffler and an exhaust pipe. Some of the exhaust gases, however, are recirculated to the combustion chamber 12 through an exhaust gas recirculation (EGR) system. The EGR system includes a valve 66 provided in an EGR passage 68. The valve 66 is controlled to determine the amount of exhaust gases recirculated through the EGR passage 68 to the combustion chamber 12.

Although the engine 10 as illustrated in FIG. 1 shows only one combustion chamber 12 formed by a cylinder and piston, it should be understood that the engine control system described herein is designated for use on a multi-cylinder engine. Thus, it should be understood that the number of the intake valves, exhaust valves, reciprocating pistons, spark plugs, and fuel injectors are the same as the number of the cylinders. Only one EGR valve 66, one throttle valve 54 and one ignition coil 36 are required for multi-cylinder applications.

The amount of fuel metered to the engine, this being determined by the width of the electrical pulses Si applied to the fuel injector 40, is repetitively determined from calculations performed by a digital computer, these calculations being based upon various conditions of the engine that are sensed during its operation. These sensed conditions includes cylinder-head coolant temperature TW, exhaust oxygen content VS, throttle position CV, engine speed N, intake air flow QA, and alcohol concentration AC. Thus, a cylinder-head coolant temperature sensor 72, an idle switch 76, a crankshaft position sensor 78, a flow meter 80, an alcohol concentration sensor 84, and an oxygen sensor 86 are connected to a control unit 90.

The cylinder-head coolant temperature sensor 72 preferably is mounted in the engine cooling system and comprises a thermistor connected in an electrical circuit capable of producing a coolant temperature signal in the form of a DC voltage having a variable level proportional to coolant temperature TW. The idle switch 76 produces an idling condition indicative signal when the throttle position is at an angle less than a fixed value, for example 6° open. The crankshaft position sensor 78 produces a series of crankshaft position electrical pulses C1, each corresponding to two degrees or rotation of the engine crankshaft, of a repetition rate directly proportional to engine speed and a series of reference electrical pulses CA at a predetermined number of degrees before the top dead center position of each engine piston. The flow meter 80 is responsive to the air flow QA through the induction passage 50 to produce an intake airflow signal proportional thereto.

The alcohol concentration sensor 84 is located at a position suitable to sense an alcohol concentration AC contained in the fuel delivered to the fuel injector 40 and it produces an alcohol concentration signal indicative of a sensed alcohol concentration AC. The alcohol concentration sensor 84 may comprise a capacitive probe inserted in the conduit 41 connected to the fuel injector 40. The capacitive prove has a capacitance variable in dependence on the alcohol concentration AC of the fuel delivered to the fuel injector 40. The capacitive probve is connected to a circuit for producing a signal proportional to the probe capacitance.

The oxygen sensor 86 monitors the oxygen content of the exhaust and it is effective to provide and air/fuel ratio feedback signal VS that shifts abruptly between a high value representing a rich mixture relative to the stoichiometric value and a low value representing a lean mixture relative to the stoichiometirc value. Consequently, the air/fuel ratio feedback signal is useful to indicate only the sense of deviation of the air/fuel ratio relative to the stoichiometric value. The output of the oxygen sensor 86 is provided to a comparator switch whose couput is high or low value representing the sense of deviation of the air/fuel ratio of the mixture supplied to the engine from the stoichiometric value. The output of the comparator switch is coupled to a circuit which provides a air/fuel ratio control signal which varies at a constant rate in one direction when the air/fuel ratio is leaner than the stoichiometric value and changes at a constant rate in the opposite direction when the air/fuel ratio is greater than the stoichiometric value. The control signal will oscillate about the stoichiometric air/fuel ratio as sensed by the oxygen sensor thereby producing an average stoichiometric air/fuel ratio of the mixture supplied to the engine.

Figure 2:
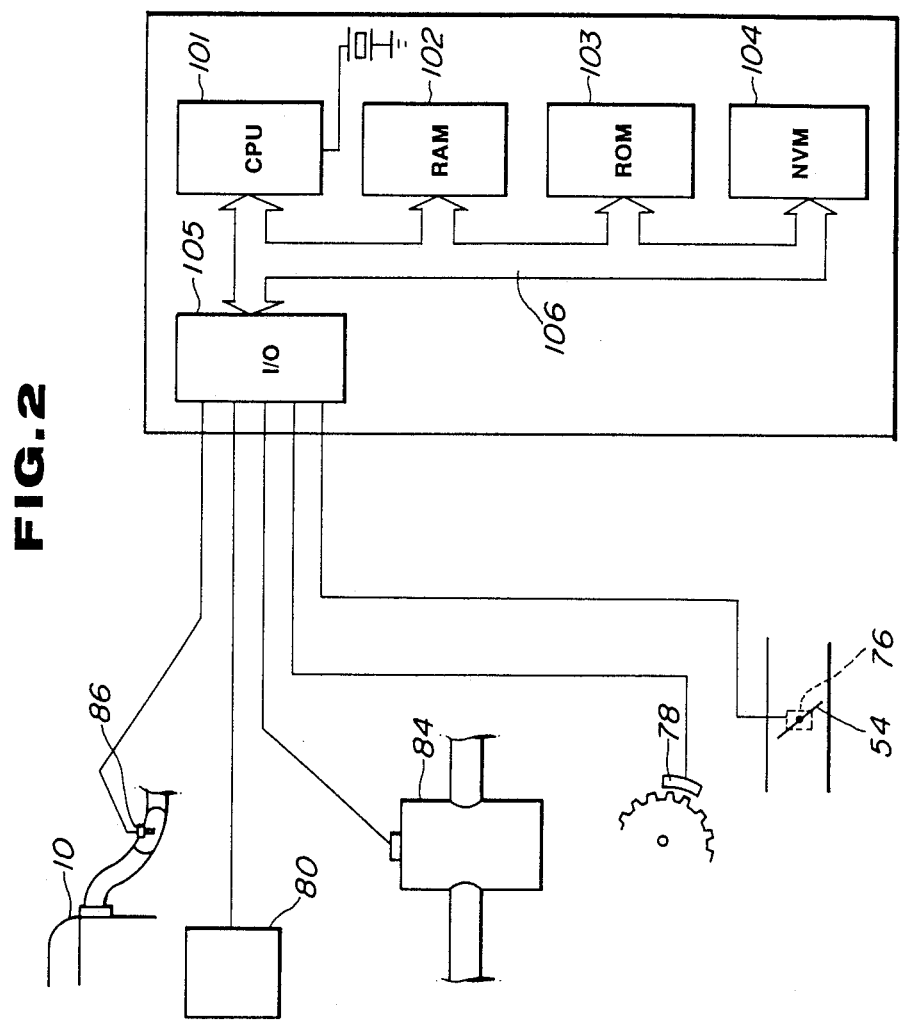
FIG. 2 is a block diagram showing the control unit used in the apparatus of the invention.

Referring to FIG. 2, the control unit 90 comprises a digital computer which includes a central processing unit (CPU) 101, a random access memory (RAM) 102, a read only memory (ROM) 103, a nonvolatile memory (NVM) 104, and an input/output control circuit (I/O) 105. The central processing unit 101 communicates with the rest of the computer via data bus 106. The input/output control circuit 105 includes an analog-to-digital converter which receives analog signals from the flow meter and other sensors and converts them into digital form for application to the central processing unit 101 which selects the input channel to be converted. The read only memory 103 contains programs for operating the central processing unit 101 and further contains appropriate data in look-up tables used in calculating appropriate values for fuel delivery requirements. The central processing unit 101 may be programmed in a known manner to interpolate between the data at different entry points.

The central processing unit 101 calculates the fuel delivery requirement in the form of fuel-injection pulse-width from an arithmetic relationship programmed into the computer. This arithmetic relationship defines fuel-injection pulse-width Ti as a function of intake air flow QA, engine speed N, and cylinder-head coolant temperature TW and it is represented as:

$$Ti = K \times (Qa/N) \times (1 + COEF) \times ALPHA \times ALC + Ts$$

where K is a constant, COEF is an engine coolant temperature related correction factor, ALPHA is a correction factor for providing a closed loop air/fuel ratio control, ALC is a correction factor related to the alcohol concentration AC contained in the fuel delivered to the fuel injector 40, and Ts is a battery voltage related correction factor.

Control words specifying desired fuel delivery requirements are periodically transferred by the central processing unit 101 to the fuel-injection control circuit included in the input/output control circuit 105. The fuel injection control circuit converts the received control word into a fuel injection pulse signal for application to a power transistor which connects the fuel injector 40 to the engine battery for a time period determined by the width of the fuel injection control pulse signal.

The central processing unit samples the closed loop air/fuel ratio control signal once for each of sampling events for calculating an average value representing the existing air/fuel ratio. The central processing unit calculates a difference ALPHA of the calculated average value relative to the stoichiometric value and stores the calculated error in the computer memory. The central processing unit utilizes the stored difference ALPHA to calculate the correction factor ALPHA which is used to further adjust the calculated injection interval in a direction to correct the sensed air/fuel ratio error.

Figure 3:
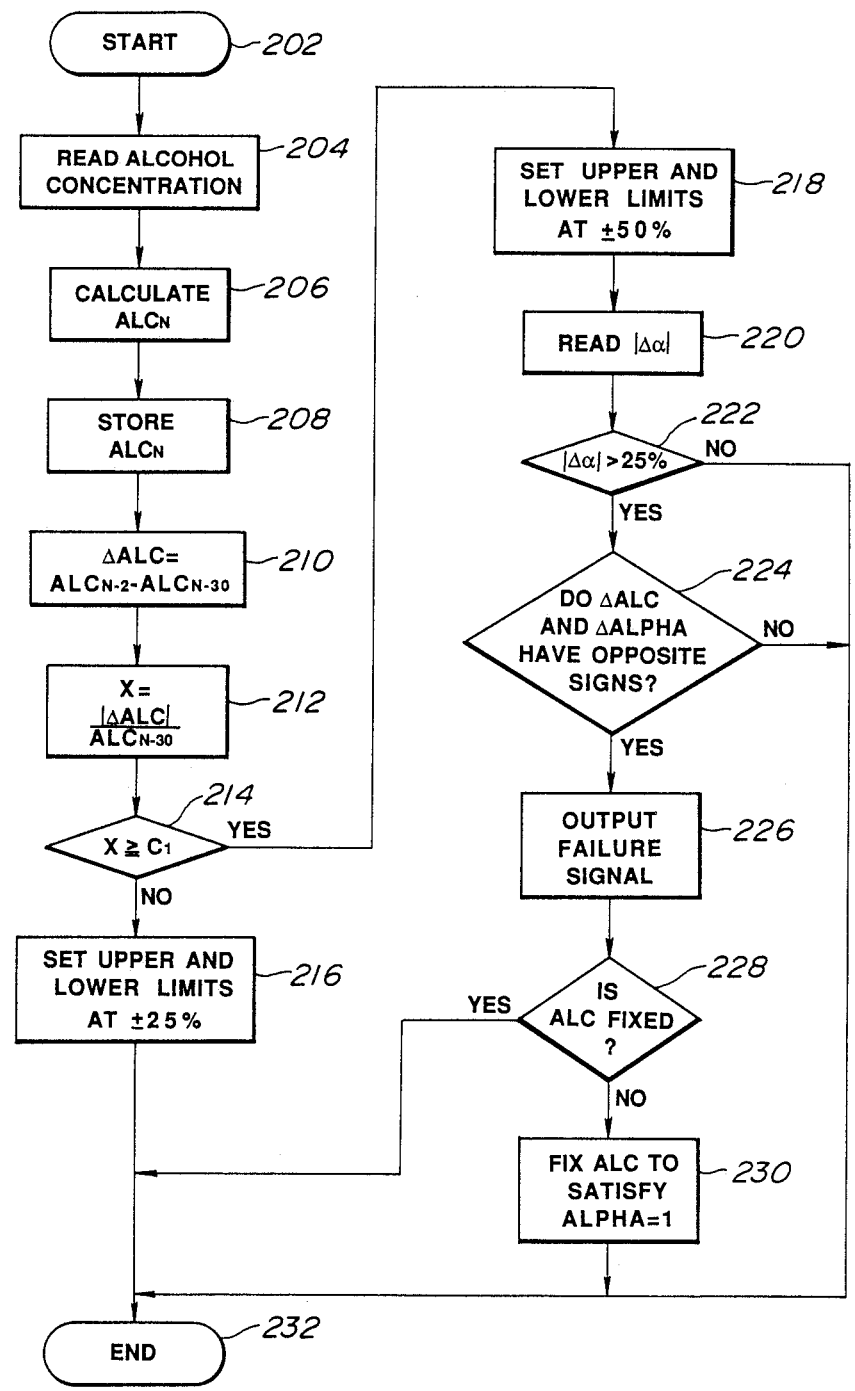
FIG. 3 is a flow diagram illustrating the programming of the digital computer as it is used to change the upper and lower limits of the control range within which the air/fuel ratio control related correction factor is set.

FIG. 3 is a flow diagram illustrating the programming of the digital computer as it is used to adjust the control range within which the feedback control related correction factor is set. The computer program is entered at the point 202 at uniform intervals of time, for example, 500 milliseconds. At the point 204 in the program, the alcohol concentration signal fed from the alcohol concentration sensor 84 is converted into digital form and read into the random access memory 102. At the point 206 in the program, the central processing unit 101 calculates a correction factor $ALC_N$ related to the alcohol concentration contained in the fuel delivered to the fuel injector 40. This calculation is made based on the read alcohol concentration signal value. The calculated correction factor $ALC_N$ is stored in the nonvolatile memory 104. The nonvolatile memory 104 accumulates recent alcohol concentration related correction factors $ALC_N$ to $ALC_{N-30}$ stored in a successve fashion at uniform time intervals of 500 milliseconds.

At the point 210 in the program, the central processing unit 101 calculates a difference $\Delta ALC$ between the old correction factors $ALC_{N-2}$ and $ALC_{N-30}$. The correction factor $ALC_{N-2}$ has been stored two correction factors (or 1 second) in advance of the new correction factor $ALC_N$ and the correction factor $ALC_{N-30}$ has been stored 30 correction factors (or about 15 seconds) in advance of the new correction factor $ALC_N$. The correction factor $ALC_{N-2}$ is used, in stead of the new correction factor $ALC_N$, in order to compensate for a time delay corresponding to the length of time during which fuel flows from the alcohol concentration sensor 84 to the fuel injector 40.

At the point 212 in the program, the central processing unit 101 calculates a ratio X of the absolute value $|\Delta ALC|$ of the calculated difference $\Delta ALC$ to the correction factor $ALC_{N-30}$ as $X = |\Delta ALC|/ALC_{N-30}$. At the point 214 in the program, a determination is made as to whether or not the calculated ratio X is equal to or greater than a predetermined value C1, for example, 0.2. If the answer to this question is NO, then the program proceeds to the point 216 where the upper and lower limits $ALPHA_{MAX}$ and $ALPHA_{MIN}$ of the control range are set at normal values ±25%. Following this, the program proceeds to the end point 232.

If $X \geq C1$, then it means that a great alcohol concentration change occurs and the program proceeds to the point 218 where the upper and lower limits $ALPHA_{MAX}$ and $ALPHA_{MIN}$ of the control range are set at ±50% to expand the control range within which the correction factor ALPHA is set so as to prevent the correction factor ALPHA from being clamped to the upper or lower limit even in the presence of a great difference between the actual alcohol concentration of the fuel delivered to the fuel injector 40 and the alcohol concentration indicated by the alcohol concentration signal. This is effective to return the correction factor ALPHA to an appropriate value in a short time. At the point 220 in the program, the absolute value |ΔALPHA| (%) of a deviation of the correction factor ALPHA from 1 (100%) is read. At the point 222 in the program, a determination is made as to whether or not the read absolute value |ΔALPHA| is greater than a predetermined value, for example, 25%. If the answer to this question is YES, then the program proceeds to the point 224. Otherwise, the program proceeds to the end point 232. At the point 224, a determination is made as to whether or not the differences ΔALC and ΔALPHA have the opposite signs. If the answer to this question is YES, then it means that the alcohol concentration signal changes in a direction requiring an increased (or decreased) amount of fuel to the engine, whereas the air/fuel ratio feedback signal changes in a direction requiring a decreased (or increased) amount of fuel to the engine and the program proceeds to the point 226 where a failure signal is outputted to indicate that the alcohol concentration sensor is subject to a failure. Otherwise, the program proceeds to the end point 232.

Upon completion of the step at the point 226, the program proceeds to the point 228 where a determination is made as to whether or not the correction factor ALC is fixed. If the answer to this question is YES, then the program proceeds to the end point 232. Otherwise, the program proceeds to the point 230 where the correction factor ALC is fixed at a value to set the correction factor ALPHA at 1.

Figure 4:
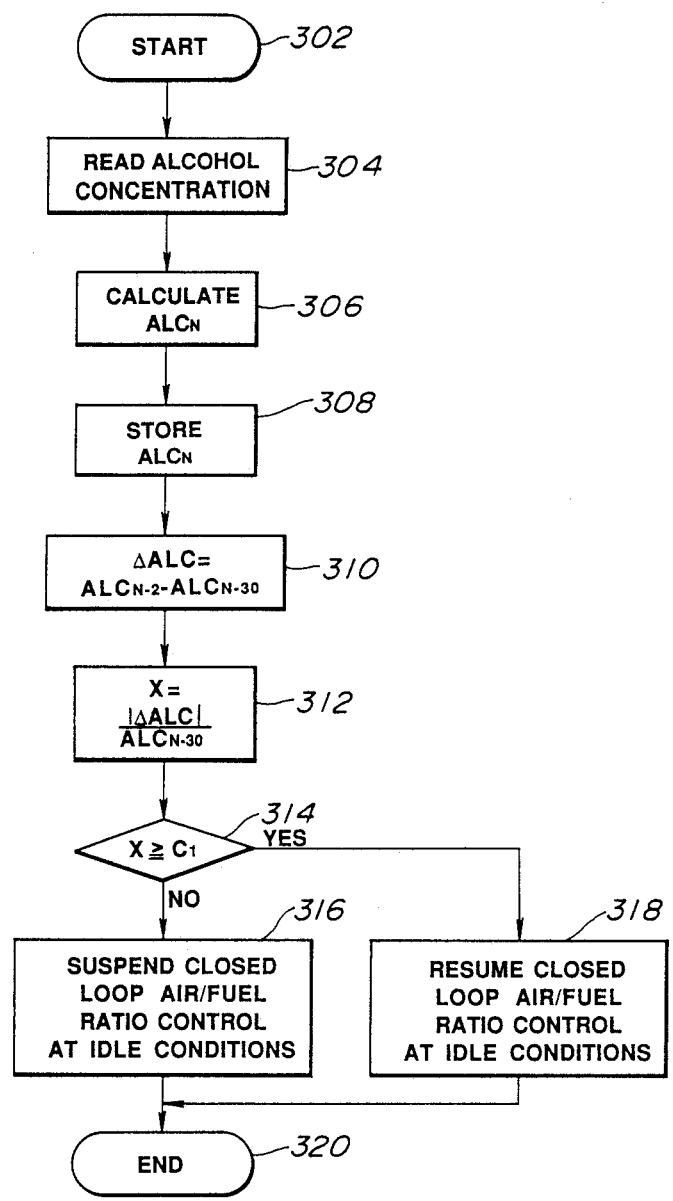
FIG. 4 is a flow diagram illustrating the programming of the digital computer as it is used to supsend and resume the closed loop air/fuel ratio control when the engine is idling.

FIG. 4 is a flow diagram illustrating the programming of the digital computer as it is used to ensure stable engine operation at idle conditions where a great alcohol concentration change will cause a great change in the air/fuel ratio. The computer program is entered at the point 302 at uniform intervals of time, for example, 500 milliseconds when the engine is idling. At the point 304 in the program, the alcohol concentration signal fed from the alcohol concentration sensor 84 is converted into digital form and read into the random access memory 102. At the point 306 in the program, the central processing unit 101 calculates a correction factor $ALC_N$ related to the alcohol concentration contained in the fuel delivered to the fuel injector 40. This calculation is made based on the read alcohol concentration signal value. The calculated correction factor $ALC_N$ is stored in the nonvolatile memory 104. The nonvolatile memory 104 accumulates recent alcohol concentration related correction factors $ALC_N$ to $ALC_{N-30}$ stored in a successive fashion at uniform time intervals of 500 milliseconds.

At the point 310 in the program, the central processing unit 101 calculates a difference ΔALC between the old correction factors $ALC_{N-2}$ and $ALC_{N-30}$. The correction factor $ALC_{N-2}$ has been stored two correction factors (or 1 second) in advance of the new correction factor $ALC_N$ and the correction factor $ALC_{N-30}$ has been stored 30 correction factors (or about 15 seconds) in advance of the new correction factor $ALC_N$. The correction factor $ALC_{N-2}$ is used, in stead of the new correction factor $ALC_N$, in order to compensate for a time delay corresponding to the length of time during which fuel flows from the alcohol concentration sensor 84 to the fuel injector 40.

At the point 312 in the program, the central processing unit 101 calculates a ratio X of the absolute value |ΔALC| of the calculated difference ΔALC to the correction factor $ALC_{N-30}$ as $X = |ΔALC|/ALC_{N-30}$. At the point 314 in the program, a deteremination is made as to whether or not the calculated ratio X is equal to or greater than a prededetermined value C1, for example, 0.2. If the answer to this question is NO, then the program proceeds to the point 316 where the correction factor ALPHA is set at a fixed value so as to suspend the closed loop air/fuel ratio control. This is effective to stabilize the speed of rotation of the engine when the engine is idling. Following this, the program proceeds to the end point 320.

If $X \geq C1$, then it means that a great alcohol concentration change occurs and the program proceeds to the point 318 where the closed loop air/fuel ratio control is resumed to prevent unstable engine operation which may be caused by a great alcohol concentration change. Following this, the program processing to the end point 320.

What is claimed is:

1. An apparatus for use with an internal combustion engine operable on either of gasoline fuel and gasoline-/alcohol fuel blend, comprising:

an alcohol concentration sensor sensitive to an alcohol concentration of the fuel to be delivered to the engine for producing an alcohol concentration signal indicative of a sensed alcohol concentration;

an oxygen sensor sensitive to an oxygen content of exhaust gases discharged from the engine for producing an air/fuel ratio feedback signal; and a control unit coupled to the alcohol concentration sensor and the oxygen sensor for controlling the amount of fuel metered to the engine, the control unit including means for calculating a basic value for the amount of fuel metered to the engine based on engine operating conditions, means responsive to the air/fuel ratio feedback signal for calculating a first correction factor based on a deviation of the air/fuel ratio from a stoichiometric value, the first correction factor being within a control range defined by predetermined upper and lower limits, means for correcting the calculated basic value for the sensed alcohol concentration, means for correcting the calculated basic value based on the calculated first correction factor to provide a closed loop air/fuel ratio control, and means sensitive to an alcohol concentration signal change exceeding a predetermined degree for changing the upper and lower limits to expand the control range.

2. The apparatus as claimed in claim 1, wherein the control unit includes means responsive to the alcohol concentration signal for calculating a second correction factor for use in correcting the calculated basic value for the sensed alcohol concentration, means for calculating a first difference between a second correction factor calculated at a first time and a second correction factor calculated at a second time delayed a predetermined time with respect to the first time, and means for changing the upper and lower limits to expand the control range when the calculated first difference exceeds a predetermined value.

3. The apparatus as claimed in claim 2, wherein the control unit includes means for calculating an absolute value of the calculated first difference, means for dividing the calculated absolute value by the second correction factor calculated at the first time to produce a quotient, and means for changing the upper and lower limits to expand the control range when the quotient exceeds a predetermined value.

4. The apparatus as claimed in claim 2, wherein the control unit includes means for multiplying the basic value by the first correction factor to provide a closed loop air/fuel ratio control.

5. The apparatus as claimed in claim 4, wherein the control unit includes means for calculating a second difference of the first correction factor from 1, means for calculating an absolute value of the second difference, means for producing a failure signal indicative of failure in the alcohol concentration sensor when the calculated absolute value exceeds a predetermined value and when the first and second differences have opposite signs.

6. The apparatus as claimed in claim 5, wherein the control unit includes means responsive to the failure signal for setting the second correction factor at a fixed value to maintain the first correction factor at 1.

7. The apparatus as claimed in claim 1, wherein the control unit includes means for clamping the first correction factor to one of the upper and lower limits to place the closed loop air/fuel ratio control into a clamped state when the engine is idling, and means for releasing the closed loop air/fuel ratio control from the clamped state in response to an alcohol concentration signal change exceeding the predetermined degree.

8. An apparatus for use with an internal combustion engine operable on either of gasoline fuel and gasoline/alcohol fuel blend, comprising:

an alcohol concentration sensor sensitive to an alcohol concentration of the fuel to be delivered to the engine for producing an alcohol concentration signal indicative of a sensed alcohol concentration;

an oxygen sensor sensitive to an oxygen content of exhaust gases discharged from the engine for producing an air/fuel ratio feedback signal; and a control unit coupled to the alcohol concentration sensor and the oxygen sensor for controlling the amount of fuel metered to the engine, the control unit including means for calculating a basic value for the amount of fuel metered to the engine based on engine operating conditions, means responsive to the air/fuel ratio feedback signal for calculating a first correction factor based on a deviation of the air/fuel ratio from a stoichiometric value, the first correction factor being within a control range defined by predetermind upper and lower limits, means for correcting the calculated basic value for the sensed alcohol concentration, means for correcting the calculated basic value based on the calculated first correction factor to provide a closed loop air/fuel ratio control, means for clamping the first correction factor to one of the upper and lower limits to place the closed loop air/fuel ratio control into a clamped state when the engine is idling, and means sensitive to an alcohol concentration signal change exceeding a predetermined degree for releasing the closed loop air/fuel ratio control from the clamped state.

9. The apparatus as claimed in claim 8, wherein the control unit includes means responsive to the alcohol concentration signal for calculating a second correction factor for use in correcting the calculated basic value for the sensed alcohol concentration, means for calculating a difference between a second correction factor calculated at a first time and a second correction factor calculated at a second time delayed a predetermined time with respect to the first time, and means for changing the upper and lower limits to expand the control range when the calculated difference exceeds a predetermined value.

10. The apparatus as claimed in claim 9, wherein the control unit includes means for calculating an absolute value of the calculated difference, means for dividing the calculated absolute value by the second correction factor calculated at the first time to produce a quotient, and means for changing the upper and lower limits to expand the control range when the quotient exceeds a predetermined value.

* * * * *